No. 761,007.

Patented May 24, 1904.

UNITED STATES PATENT OFFICE.

PAUL ERWIN OBERREIT, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN.

CHLORINATED INDIGO AND PROCESS OF MAKING SAME.

SPECIFICATION forming part of Letters Patent No. 761,007, dated May 24, 1904.

Original application filed February 11, 1902, Serial No. 93,538. Divided and this application filed February 12, 1903. Serial No. 143,127. (No specimens.)

*To all whom it may concern:*

Be it known that I, PAUL ERWIN OBERREIT, doctor of philosophy and chemist, a subject of the King of Saxony, residing at Ludwigshafen-on-the-Rhine, in the Kingdom of Bavaria, Empire of Germany, have invented new and useful Improvements in Chlorinated Indigo Coloring-Matter, of which the following is a specification, this application being a division of United States patent application, Serial No. 93,538, filed February 11, 1902, for indigo coloring-matter containing halogen.

This invention relates to new indigo coloring-matters containing chlorin and process of producing same. These products will hereinafter be referred to by the generic term "chlorinated indigo."

The process employed in this invention consists, essentially, in converting chlorinated phenyl-glycocoll-ortho-carboxylic acid into, for instance, acetylated chlor-indoxyl derivatives, and finally converting these products into the corresponding chlorinated indigo coloring-matters. This can be carried into practical effect by treating a chlor-phenyl-glycocoll-ortho-carboxylic acid (preferably in the form of its sodium salt) with, say, acetic anhydrid, acting on this result (preferably in the dry and purified state) with, say, caustic-soda solution, and then blowing air through the liquid thus obtained.

The chlorinated phenyl-glycocoll-ortho-carboxylic acid employed can be obtained by direct chlorination of phenyl-glycocoll-ortho-carboxylic acid itself or by chlorinating the nitril of that acid—namely, cyan-methyl-anthranilic acid, which is described in United States Letters Patent No. 662,754, dated November 27, 1900—and subsequently converting the product obtained in this way into chlorinated phenyl-glycocoll-ortho-carboxylic acid by suitable saponification.

In the following examples the nature of this invention is further illustrated; but this invention is not limited to the proportions and conditions given therein. The parts are by weight and the temperature-degrees refer to the centigrade scale.

*Example 1—Production of Chlorinated Phenyl-glycocoll-ortho-carboxylic Acid.*

A. *From phenyl-glycocoll-ortho-carboxylic acid.*—Suspend one hundred and ninety-five (195) parts of phenyl-glycocoll-ortho-carboxylic acid in six hundred (600) parts of glacial acetic acid and add gradually and stirring the meanwhile seventy-one (71) parts of chlorin. Allow it to stand for several hours, pour the result into three thousand (3,000) parts of water, filter, and wash with water until the filtrate no longer contains hydrochloric acid, as shown by testing with silver nitrate. The monochlor-phenyl-glycocoll-ortho-carboxylic acid so obtained when purified by recrystallization from ethyl alcohol can be obtained in the form of yellow needles melting at between two hundred and ten (210°) and two hundred and fifteen (215°) degrees. If one hundred and forty-two (142) parts of chlorin be employed in place of the seventy-one (71) parts above directed and the remaining conditions be observed, a dichlor-phenyl-glycocoll-ortho-carboxylic acid is obtained which crystallizes from ethyl alcohol in yellow needles whose melting-point is at about two hundred and thirty-seven degrees, (237°.) In place of the glacial acetic acid of this example benzene or ligroin may be employed.

B. *From cyan-methyl-anthranilic acid.*—Suspend one hundred and seventy-six (176) parts of cyan-methyl-anthranilic acid in six hundred (600) parts of glacial acetic acid and add seventy-one (71) parts of chlorin, cooling the meanwhile. At first solution ensues and then the monochlor-cyan-methyl-anthranilic acid begins to separate out. When no further separation takes place, filter off the solid material and wash with water. The acid when purified by recrystallization from ethyl alcohol occurs in yellow needles melting at about two hundred degrees, (200°.)

If in the above example one hundred and forty-two (142) parts of chlorin be employed, dichlor-cyan-methyl-anthranilic acid is obtained. When purified, it melts at about two hundred and twenty-three degrees, (223°.) To convert the so-obtained chlor-cyan-methyl-anthranilic acids into the corresponding chlor-phenyl-glycocoll-ortho-carboxylic acids, boil them with an excess of caustic-alkali solution—say with caustic-soda solution containing about fifteen (15) per cent. of caustic soda (NaOH)—until ammonia is no longer given off. Then cool and precipitate the chlor-phenyl-glycocoll-ortho-carboxylic acid by means of, say, sulfuric acid. The chlorinated phenyl-glycocoll-ortho-carboxylic acids so obtained can be converted into their, say, sodium salt by suitable treatment with sodium-carbonate solution and subsequently evaporating to dryness on, say, a boiling-water bath.

*Example 2—Production of Chlorinated Indigo.*

Boil one (1) part of the dry and finely-powdered sodium salt of monochlor-phenyl-glycocoll-ortho-carboxylic acid with from three (3) to four (4) parts of acetic anhydrid until evolution of gas ceases. Then distil off the excess of acetic anhydrid *in vacuo*. The dry residue may be directly operated upon; but it is preferable to extract the same with water and to recrystallize this residue from alcohol, and finally from ligroin. Now saponify this product (which is to be regarded as diacetyl-chlor-indoxyl) by means of an excess of caustic-soda solution, blow air through the resulting liquid, and collect the dichlor-indigo so resulting in any suitable manner. This product resembles ordinary indigo in its external appearance, but is distinguished from ordinary indigo by its containing chlorin and by producing a clearer and more reddish shade of blue when dyed on cotton from a vat such as is adapted for dyeing with ordinary indigo. This coloring-matter is easily soluble in cold glacial acetic acid, yielding a solution which while cold is blue. It is very easily soluble in cold monohydrated sulfuric acid, yielding a solution which while cold is green. It is easily soluble in cold carbon bisulfid.

If dichlor-phenyl-glycocoll-ortho-carboxylic acid be employed in place of the mono-chlor-phenyl-glycocoll-ortho-carboxylic acid in the process just described, then a substance is obtained which is to be regarded as tetrachlor indigo. The tetrachlor indigo so obtained differs from ordinary indigo in external appearance, its color being far more brilliant than that of ordinary indigo, and this tetrachlor indigo is not changed in color by means of even strong nitric acid ($HNO_3$) in the cold, which is so characteristic a reaction for ordinary indigo. It is further distinguished from ordinary indigo by the fact that fiber dyed with it when wetted with caustic-soda solution containing about thirty-five (35) per cent. caustic soda (NaOH) becomes colorless.

I claim—

1. Process for the production of chlorinated indigo, which consists in acting upon cyan-methyl-anthranilic acid successively with chlorin, caustic alkali, acetic anhydrid, caustic alkali and air.

2. Process for the production of chlorinated indigo, which consists in acting upon chlorinated cyan-methyl-anthranilic acid successively with caustic alkali, acetic anhydrid, caustic alkali and air.

3. Process for the production of chlorinated indigo, which consists in acting upon chlorinated phenyl-glycocoll-ortho-carboxylic acid successively with acetic anhydrid, caustic alkali and air.

4. Process for the production of chlorinated indigo, which consists in acting upon acetylated chlorinated indoxyl with caustic alkali and air.

5. Process for the production of tetrachlor indigo, which consists in acting upon acetylated dichlor-indoxyl with caustic alkali and air.

6. As a new article of manufacture indigo coloring-matter which can be made from acetylated monochlor-indoxyl, caustic-soda solution and air; which contains chlorin and dyes cotton from the vat giving blue shades; which is easily soluble in cold glacial acetic acid yielding a solution which, while cold, is blue; which is very easily soluble in cold monohydrated sulfuric acid yielding a solution which, while cold, is green; which is easily soluble in cold carbon bisulfid.

In testimony whereof I have hereunto set my hand in the presence of two subscribing witnesses.

PAUL ERWIN OBERREIT.

Witnesses:
  JOHN L. HEINKE,
  JACOB ADRIAN.